W. D. COLLINS.
PERCOLATOR.
APPLICATION FILED MAY 27, 1914.

1,136,776.

Patented Apr. 20, 1915.
3 SHEETS—SHEET 1.

WITNESSES

INVENTOR
WILLIAM D. COLLINS
BY
ATTORNEYS

W. D. COLLINS.
PERCOLATOR.
APPLICATION FILED MAY 27, 1914.

1,136,776.

Patented Apr. 20, 1915.
3 SHEETS—SHEET 2.

WITNESSES

INVENTOR
WILLIAM D. COLLINS
BY
ATTORNEYS

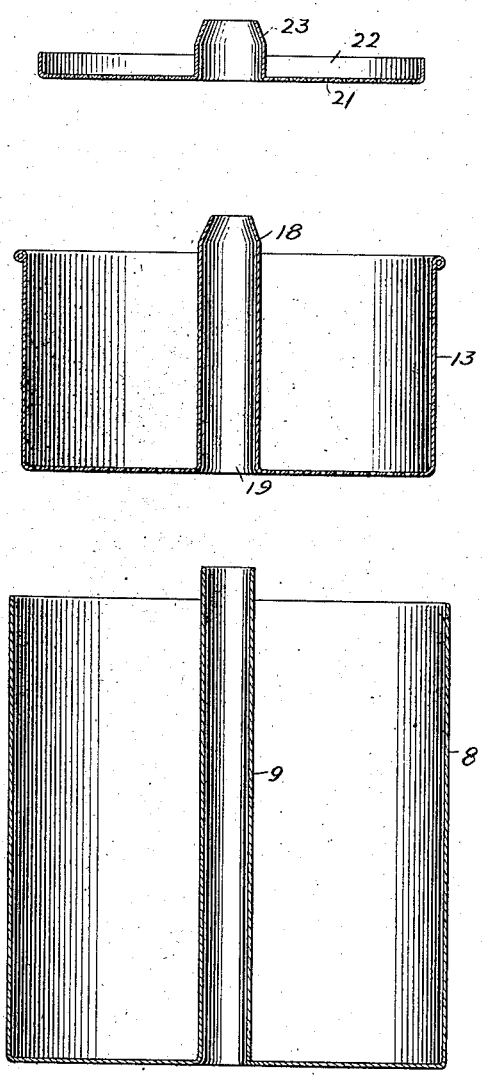

UNITED STATES PATENT OFFICE.

WILLIAM D. COLLINS, OF NEW YORK, N. Y.

PERCOLATOR.

1,136,776.  Specification of Letters Patent.  Patented Apr. 20, 1915.

Application filed May 27, 1914. Serial No. 841,243.

*To all whom it may concern:*

Be it known that I, WILLIAM D. COLLINS, a citizen of the United States, and a resident of the city of New York, borough of Manhattan, in the county and State of New York, have invented a new and Improved Percolator, of which the following is a full, clear, and exact description.

Among the principal objects which the present invention has in view are: to avoid boiling of the coffee while making the same; to pass heated water through the ground coffee once only; to provide an independent receptacle for the liquid coffee; to avoid cooling the heated water while elevating the same for delivery upon the coffee pack and also avoid heating the liquid coffee in its receptacle; and to avoid breaking the glass cover with which the outer receptacle is provided.

Figure 1:
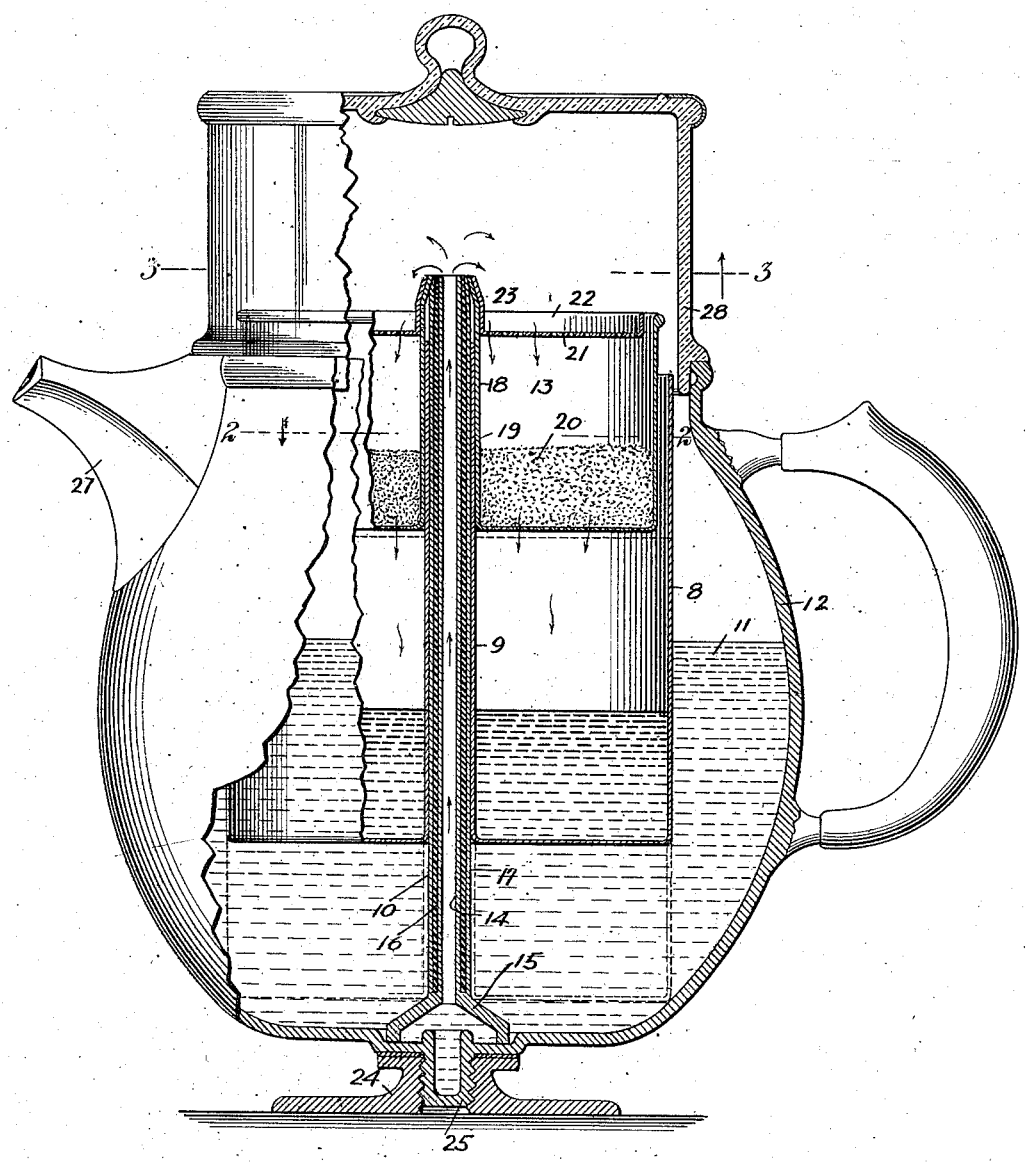
Figure 2:
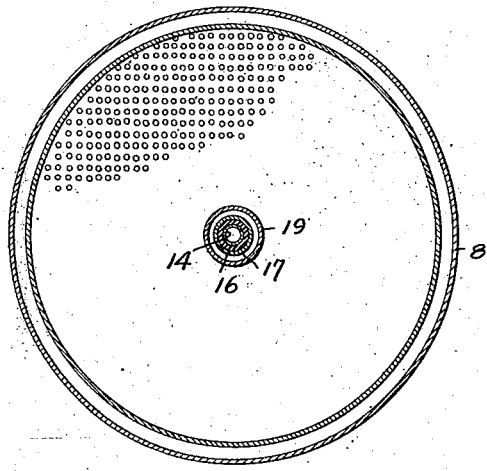
Figure 3:
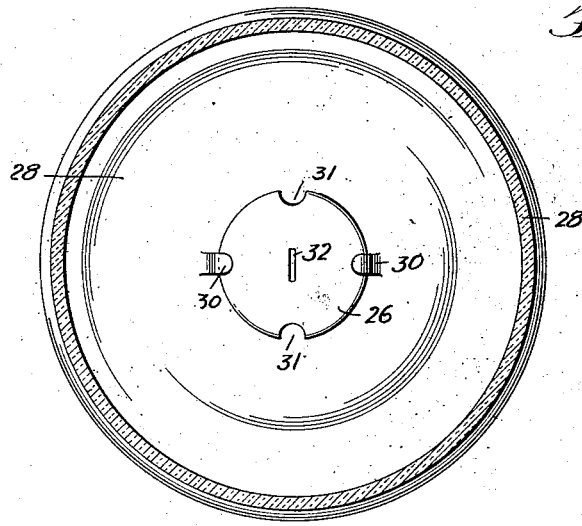

Drawings: Figure 1 is a side view, partly in section, of a percolator constructed and arranged in accordance with the present invention; Fig. 2 is a horizontal section taken on the line 2—2 in Fig. 1; Fig. 3 is a horizontal section taken on the line 3—3 in Fig. 1. Fig. 4 is a vertical section of the liquid coffee container, the ground coffee holder, and the cover for said holder, said parts being shown in disassociated rotation.

Description: In the conventional form of percolators, the coffee pack holder is employed in conjunction with, and is supported by, a central tube, the lower end of which is arranged to trap a relatively small quantity of hot water, and to produce steam to elevate the water, for the delivery thereof over and upon the pack or confined ground or pulverulent coffee beans. This relatively superheated water percolates through the coffee pack, extracting the essence therefrom to drip into the main body of water in the percolator receptacle or coffee-pot. The main body of the water, being relatively cooler than that which has been passed through the coffee pack, operates to reduce the temperature of the liquid coffee thus introduced into the body of the water. The continuation of the operation ultimately equalizes the temperatures of the main body of water and the liquid which has passed through the pack. At the termination of the operation, the liquid coffee is discovered to have been boiled after the essence has been extracted from the coffee pack. If this operation be continued beyond a certain point, it will be found that the coffee is bitter, or that the flavor thereof has been otherwise impaired. In the present invention, the above objection is avoided by employing a liquid-coffee container 8. The container 8 is provided with a central vertically-disposed tube 9. The tube 9 is rigidly connected with the bottom of the container 8, and is open-ended, being intended for use as a guide in conjunction with the supporting column 10. The tube 9 loosely fits the column 10 to permit the container 8 to float in the water 11 with which the pot 12 is initially supplied. The upper edge of the container 8 may, at the beginning of the operation of making the coffee, extend to or above the upper edge of the coffee-holder 13. As the operation of making the coffee is proceeded with, the relation of the container 8 and the holder 13 changes, until, at the completion of the operation, the upper edge of the container 8 rests below the level of the bottom of the holder 13.

The column 10 is preferably provided with an interior wall 14. This wall is rigidly or integrally connected with an inverted frusto-conical base 15. The wall 14 is covered with a heat-insulating lining 16. The insulating lining 16 is covered by an exterior tube 17. The wall 14 and the tube 17 are constructed of metal, and the joint at the bottom of the tube 17 with the base 15 is constructed to prevent the intrusion of water to the lining 16. This construction of the column 10 provides means for preventing the cooling of the water when passing upward through said column due to the presence of a relatively cooler mass in the body of the water 11 in the pot 12. The construction also makes provision against the heating of the liquid coffee by the rising column of water, which might otherwise happen. The upper end of the column 10 is slightly tapered to fit a correspondingly tapered sheath tube 18, with which the holder 13 is provided. At the lower end of the tube 18 is formed a guide portion 19, adapted to receive loosely therein the tube 9 of the container 8 when said container is in its relatively elevated position. The body of the tube 18 fits snugly the tube 9, while the upper extremity thereof, as above stated, is contracted to fit the tapered end of said column 10, when the holder 13 is deposited upon the column 10. This occurs when the container 8 settles or falls in the pot 12, due to the transfer of water from said pot to said container.

What is herein styled the "coffee pack", indicated in the drawings by the number 20, is the mass of ground or pulverized coffee which is placed in the holder 13 when said holder is mounted on the column 10. During the operation of coffee making, the pack 20 is supported upon the perforated bottom of the holder 13, as in the conventional constructions, the perforations in said bottom being reduced so as not to permit the coffee particles to pass therethrough. The particles are prevented from swelling upward out of said holder if the delivery of water be too rapid, by a cover 21, which is likewise perforated.

The cover 21 has an upstanding flange 22 adapted to hold or concentrate the flood of water delivered thereto by the column 10. The cover 21 has a centrally-disposed nipple 23. The upper end of said nipple is contracted over the sheath tube 18, to be supported thereby in service. The cover 21 is placed on said tube 18 after the pack 20 has been placed in the holder 13, and the holder 13 thus equipped is placed on the tube 9, the container 8 having previously been placed on said column 10.

The pot 12 is preferably supported by a base 24. The base 24 in the present instance is mounted on the pot by means of a screw-threaded hollow boss 25. It will be observed that the lower end of the boss 25 opens within the interior or chamber of the base 15 of the column 10. The lower edge of the base 15 is not, as in former constructions, provided with special openings or channels for the admission of the water from the body of the pot 12, it being desired to limit the escape of water therefrom. The water in the column 10 is thereby heated more rapidly than by conventional heaters, prior to being delivered by said column to the holder 13.

It will be understood that when the water trapped below the base 15 is sufficiently heated to lift the water in the column 10, the surrounding water will flow under the base 15 to replace the heated water that has been forced upward through said column. While no special preparation is made for the introduction of water beneath the annular edge of the base 15, it will be understood that water is always present under the said base. Further, it will be seen that by reason of the relatively close fit of the edge of the base 15 with the bottom of the receptacle the full lifting force of the water trapped under the said base is exerted to lift or "pump" the water up the said column 10.

The pot 12 is provided with a cover 28, preferably constructed from glass and having a hollow knob 29 centrally disposed thereon. The knob 29 provides within the cover 28 a seat for a metal spreader 26. The spreader 26 is supported, when the cover is inverted, by ear tabs 30. The ear tabs 30 are under-cut, as best seen in Fig. 1 of the drawings, and in service extend under, to support, the spreader 26. To permit the spreader 26 to be installed in service, said spreader is provided with recesses 31, which recesses aline with, and permit the passage therethrough, of the tabs 30. This construction may be modified by suspending the spreader from the hollow in the knob with which the cover 28 is usually provided.

To assist in handling the spreader 26, a slot 32 is formed therein to receive the end of a screw-driver, case knife or other convenient implement whereby said spreader may be turned. The spreader 26 is disposed in service directly above, and may be proximated to the opening of, the channel in the column 10. By so disposing the spreader, the hot water delivered by the column 10 is received directly upon the spreader, and the breaking of the glass of which the cover 28 is constructed, is so avoided.

Operation: With an apparatus constructed and arranged in a manner as above described, and as shown in the accompanying drawings, the operation is as follows:— The first step in the operation is to prepare the receptacle 12 by supplying the same with the charge of water 11. The column 10 is then installed, the base 15 thereof being adjusted over the boss 25. The container 8 is then placed over the column 10 to rest upon and be floated by the water 11. The holder 13 having been packed with ground coffee 20, the cover 21 is set firmly on the end of the tube 18. In some instances, the end of the tube 18 is prepared to better hold the nipple 23 by forming said end of the tube of relatively soft metal, it being understood that the union between the nipple 23 and the end of the tube 18 is tight. The holder 13 thus covered, is introduced above, to slide over the upper end of the tube 9, to be thereafter supported thereby, and thus indirectly be floated by the water 11 in the receptacle 12, but when sufficient water has passed to container 8, then holder 13 rests on column 10. When the water trapped within the base 15 has been sufficiently heated to rise in the column 10, a further supply is drawn under the edge of the base 15 until the heat of the water in said column being increased, it is ejected through the open end of said column, to impinge on the metal spreader 26. The water thus deflected is delivered to the tray-like top of the cover 21 to pass therethrough upon the coffee pack 20, extracting the essence therefrom, and enters the container 8. As the liquid coffee accumulates in the container 8, the specific gravity of said container is varied, causing the same to relatively settle in the water 11. The displacement of the water 11 compensates for the loss of the water passed from the body thereof to the interior of the container 8, and in this manner averages the level of the water 11 in the pot 12, until at the end of the operation when all of the water has entered the container 8. The above-described operation is continued until the entire body of water 11 has passed from the pot 12 to within the container 8.

It will be observed that in the operation above described, the liquid coffee is never subjected to the direct influence of the heating medium, a body of water being, up to the last, maintained between the bottom of the pot 12 and the container 8. Therefore, the liquid, after having passed through the coffee pack 20, is not again boiled or repassed through said pack.

The coffee is poured from the pot 12 as in any percolator of conventional construction. In the present instance however, the coffee, instead of being held in the body of the container 8, will be delivered therefrom to the spout 27 of the pot when uptilted to pour the liquid from said pot. In this operation, should the coffee overflow from the container 8 to the body of the pot 12, no ill effects would result therefrom. Further, if the small portion of water remaining in the pot 12 should mix with the coffee, no other objection than a slight weakening of the initially-poured coffee would arise therefrom.

Claim:

A percolator comprising a main water receptacle; a holder for comminuted coffee, arranged to permit liquid to pass therethrough; a supporting column for said holder, said column having a chambered base resting on the bottom of said receptacle for trapping water delivered from said receptacle, for super-heating the same to lift the contents of said column above, for delivery to, said holder; a container for liquid coffee disposed in guided relation to said column, said container being completely immersed in, to be floated by, water in said receptacle, said container telescopically infolding, when lifted, said holder, the side walls of said receptacle and said container being spaced apart for holding a body of water surrounding said container to maintain the heat therein and to prevent the boiling of the liquid coffee held thereby.

In testimony whereof I have signed my name to this specification in the presence of two subscribing witnesses.

WILLIAM D. COLLINS.

Witnesses:
E. F. MURDOCK,
PHILIP D. ROLLHAUS.